United States Patent [19]

Krim

[11] Patent Number: 5,408,362
[45] Date of Patent: Apr. 18, 1995

[54] METHOD FOR ALTERING THE COEFFICIENT OF THERMAL EXPANSION OF A MIRROR

[75] Inventor: Michael H. Krim, Trumbull, Conn.

[73] Assignee: Hughes Aircraft Company, Los Angeles, Calif.

[21] Appl. No.: 80,791

[22] Filed: Jun. 22, 1993

[51] Int. Cl.⁶ ............................................. G02B 5/08
[52] U.S. Cl. ................................... 359/846; 359/848; 359/850
[58] Field of Search ............... 359/846, 848, 883, 869, 359/870, 845, 850–853; 428/422; 427/162, 165, 404, 419.2

[56] References Cited

U.S. PATENT DOCUMENTS

| | | | |
|---|---|---|---|
| 2,988,959 | 6/1961 | Pelkey | 359/848 X |
| 3,609,589 | 9/1971 | Hufnagel | 359/846 X |
| 3,754,812 | 8/1973 | Mohn | 359/848 |
| 4,466,700 | 8/1984 | Christiansen | 359/848 |
| 4,663,234 | 5/1987 | Bouton | 428/422 |
| 4,670,338 | 6/1987 | Clemino | 359/846 X |
| 4,993,824 | 2/1991 | Bluege | 359/846 |

Primary Examiner—Eugene R. LaRoche
Assistant Examiner—Son Mai
Attorney, Agent, or Firm—Michael W. Sales; Wanda K. Denson-Low

[57] ABSTRACT

A front to back coefficient of thermal expansion difference between surfaces of a mirror segment is reduced by coating a selected surface. The other surface may be also coated in order to obtain an overall bulk coefficient of thermal expansion for the mirror segment. A plurality of mirror segments having coefficients of thermal expansion matched by coatings are selected for assembly thereby avoiding the need to physically change the positions of the various segments in order to bring them into correct relationship or to refocus the image using other optics.

9 Claims, 6 Drawing Sheets

FIG.4B $(\alpha_1+\alpha_2)/2=\bar{\alpha}$
$(\alpha_1-\alpha_2)=\alpha'$

FIG.4A

METHOD FOR TUNING THE CTE OF GLASS MIRRORS
BY APPLIED METALLIC OR DIELECTRIC COATINGS

EXAMPLE SHOWN IS FOR THE 50 kg/m² SUBSTRATES
EQUIVALENT SOLID THICKNESS: 23mm
NOMINAL CTE: 0.027 ppm/°C
ALL MATERIAL PROPERTIES IN THIS TABLE ARE IN INTERNATIONAL UNITS

| PLATING | COEFFICIENT OF THERMAL EXPANSION (CTE) ppm/°C CTE x $10^{-6}$ | MODULUS OF ELASTICITY GPA x $10^6$ | CTE x GPA | PLATING THICKNESS (microns) | | | | | | |
|---|---|---|---|---|---|---|---|---|---|---|
| | | | | 0.3 | 0.6 | 1.25 | 2.5 | 5 | 10 | 20 |
| ALUMINUM | 23.6 | 69 | 1628 | .02727 | .02754 | .02781 | .02916 | .03132 | .03562 | .04424 |
| COPPER | 16.2 | 117 | 1895 | .02734 | .02768 | .02837 | .02975 | .03249 | .03799 | .04896 |
| SILICON CARBIDE | 2.7 | 415 | 1120 | .0272– | .02739 | .02781 | .0286– | .0302– | .03341 | .03976 |
| QUARTZ | 0.29 | 69 | 20.1 | .027– | .027– | .027– | .027– | .0271– | .02711 | .02722 |
| CHROMIUM | 6.1 | 173 | 1055 | .0272– | .02738 | .02776 | .02853 | .03– | .03308 | .03916 |
| BERYLLIUM | 11.3 | 305 | 3446 | .02763 | .02824 | .02948 | .03197 | .03695 | .04687 | .06669 |
| MOLYBDENUM | 5.1 | 325 | 1657 | .02729 | .02759 | .02817 | .02936 | .03172 | .03641 | .04577 |
| SILICON | 2.5 | 131 | 327 | .027– | .02713 | .02754 | .02747 | .02795 | .02889 | .03078 |

METHOD FOR ALTERING THE COEFFICIENT OF THERMAL EXPANSION OF A MIRROR

BACKGROUND OF THE INVENTION

1. Field of the Invention

This invention relates to mirrors and, more particularly, to a method for altering the coefficient of thermal expansion (CTE) of a mirror.

2. Description of Related Art

Small but nonetheless significant variations in the coefficients of thermal expansion (CTEs) between the front and back faceplates of mirrors used in a segmented aperture system can have significant effects on the optical quality of the image. Upon the application of a temperature change these mirrors will bend and the probability of them all bending identically, even for a uniform temperature change, is vanishingly small considering the precision required of these elements. Specifically the radius of curvature of these mirror segments need to be made and maintained to tolerance level approaching only several parts per million. From the following relationship $$\frac{\Delta R}{R} = \frac{R \Delta \alpha \Delta \overline{T}}{h}$$

where $\Delta \alpha$ is the difference in CTE's between the two faceplates and $\Delta \overline{T}$ is the bulk temperature change, a 5 ppm radius of curvature precision ($\Delta R/R$) would demand that $\Delta \alpha$ be 5 part per billion (ppb) for a $\Delta T$ of 5° F. for a segment whose radius of curvature, R, was 25 m. The effect of CTE mismatches can be compensated for by mechanical actuators for bending the mirror back into shape, but this adds undue complexity for certain applications. On the other hand, with a sufficient inventory of glass, such as Ultra Low Expansion (ULE) glass from Corning Glass Co., from which to choose, a CTE matching could be accomplished for as many segments as are needed for any given system, although this is a difficult task in terms of cost, schedule, etc. Mitigation of these difficulties would be desirable. In other words, a better method is needed to compensate for these variations to facilitate meeting the sometimes stringent segment-to-segment matching requirements that are often necessary. This would most desirably be accomplished after the segments are fabricated and their actual coefficients of thermal expansion determined by optical measurement in the presence of a known temperature distribution.

SUMMARY OF THE INVENTION

An object of the present invention is to provide a method for adjusting the coefficient of thermal expansion difference between opposing sides of a mirror segment.

Another object of the present invention is to provide a method to equalize the bulk average coefficients of thermal expansion of a plurality of mirror segments in a controlled and deterministic manner subsequent to fabrication of the substrates.

According to a first aspect of the present invention, a mirror segment having front and back surfaces has a front to back coefficient of thermal expansion difference determined; and, a coating is then applied to a selected surface to reduce the difference. The difference may be reduced to zero or substantially to zero.

In accord with a second aspect of the present invention, the front, back, or both front and back surfaces may be coated to obtain a selected overall bulk coefficient of thermal expansion for the mirror segment.

In still further accord with the second aspect of the present invention, a plurality of mirror segments having bulk coefficients of thermal expansion matched by coatings in the above described manner are selected for assembly into a segmented mirror.

The disclosed method teaches how to physically alter the CTE of, e.g., ULE mirror segments to meet the stringent segment-to-segment matching requirements necessary for operation in a changing thermal environment without the need for multiple secondary optics or shape altering actuators.

The CTE "tuning" may be accomplished with thin film metal coatings applied after the thermal deformation characteristics of the substrate are measured holographically or as inferred from vendor CTE data.

The method enables successful operation of large segmented, phase coherent mirrors having only rigid body segment position control in the presence of axial gradient and isotropic (bulk) temperature changes. To date, all segmented systems rely on an array of bending actuators behind the mirror to control curvature (as well as higher order aberrations). Large segmented optical telescopes, both terrestrial and space-based may be made according to the invention.

These and other objects, features and advantages of the present invention will become more apparent in light of the detailed description of a best mode embodiment thereof, as illustrated in the accompanying drawing.

DESCRIPTION OF PREFERRED EMBODIMENTS

Figure 1:
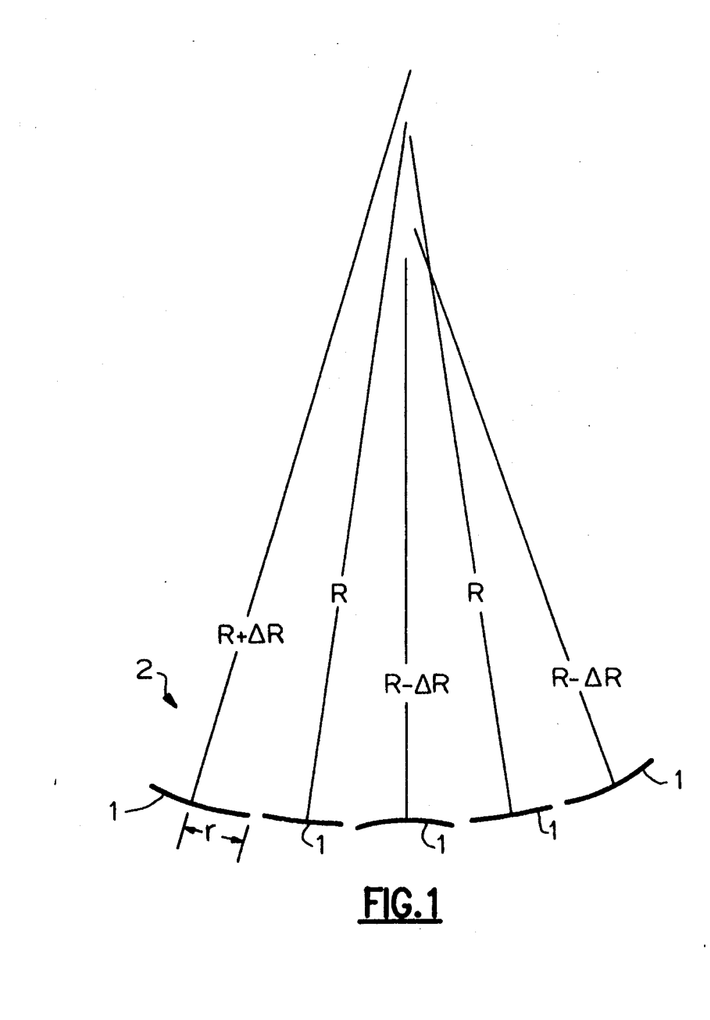
FIG. 1 shows a segmented mirror for illustrating a key teaching of the present invention.
Figure 2:
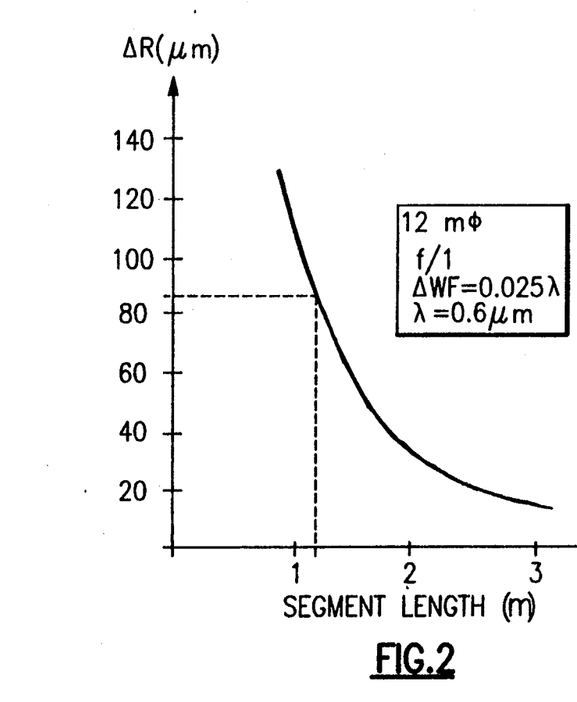
FIG. 2 shows $\Delta R$ as a function of segment length, according to the teachings of the present invention.

FIGS. 1 and 2 illustrate how the tolerance of the radius of curvature of the various segments of a segmented mirror is a major consideration in controlling wavefront error. It is a key teaching of the present invention that, in order to control wavefront error in a cost effective manner, the tolerance of the radius of curvature of each individual segment must be understood and controlled at the fabrication level. The radius of curvature tolerance issue in its simplest terms is shown in FIG. 1 where a plurality of mirror segments 1 are assembled to form a segmented mirror 2 supposedly having a radius of curvature (R). However, because of individual variations between segments, which may be traced back to the fabrication process, the coefficients of thermal expansion may not be completely uniform and may lead to differences in the expected radius of curvature for each segment, as shown, when subjected to temperature changes. The various segments 1 are shown having different radii of curvature which deviate from the ideal value (R) by a small amount ($\Delta R$). As a result, every segment focuses at a different point and cannot be compensated for by simply repositioning the secondary mirror, as is accomplished with conventional monolithic mirror systems. The present invention teaches that this dilemma can be avoided by steps taken at the fabrication level.

FIG. 2 shows $\Delta R$ as a function of segment length (r) for a 12 meter focal length mirror having an aperture of f/1 for focusing light having a wavelength of 0.6 μm and a wavefront error ($\Delta WF$) allocation of 0.025λ (16 nm). For a specific $\Delta R$, the wavefront error ($\Delta WF$) is proportional to segment size squared from the approximate relationship:

$$\Delta WF \cong \frac{1}{3.4} [r^2/R^2] \Delta R.$$

From this relationship, the allowable value of $\Delta R$, consistent with that $\Delta WF$ may be estimated. Substituting, for an example, 0.6 m for 'r' and 12 m for R and 0.042 μm for $\Delta WF$, the allowable limit on $\Delta R$ becomes 60 μm. What the relationship between temperature change and the CTE distribution in the mirror is described in the following paragraph.

Figure 3A:
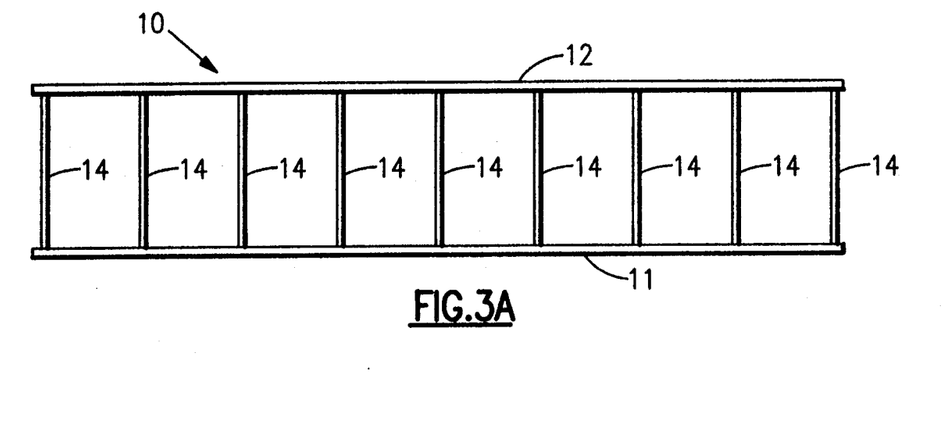
FIGS. 3A and 3B respectively show lesser and more detailed views of a mirror segment that may be used in a segmented mirror (such as a segment 1 shown in FIG. 1); such a segment may have its coefficient of thermal expansion modified, in accordance with the teachings of the present invention.

As shown in FIG. 3A, a light weighted mirror segment 10 (See, e.g., mirror 2 of FIG. 1), has back and front glass plates 11, 12. Each mirror will have its front and back plates held together by an assembly of ribs 14 as shown. A typical segment 10, as shown, may have dimensions, for example, of 13 cm thickness, 125 cm long and 64 cm wide as shown in more detail in FIG. 3B.

The basic issue here is how closely the CTE's of the front and back plates are matched.

Figure 4A:
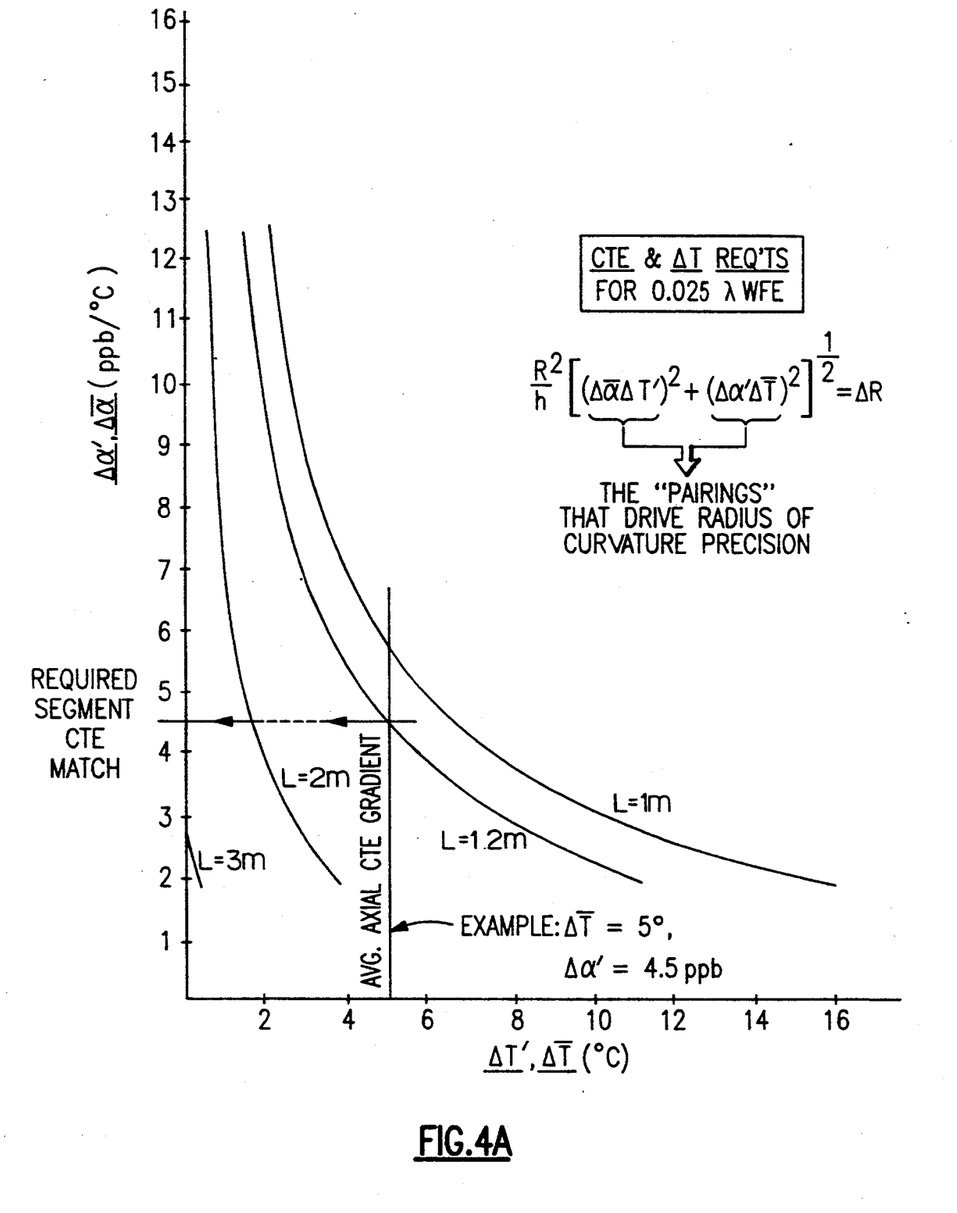
FIG. 4A shows, according to the teachings hereof, a plot of CTE and $\Delta T$ requirements for a selected wavefront error of 0.025λ.
Figure 4B:
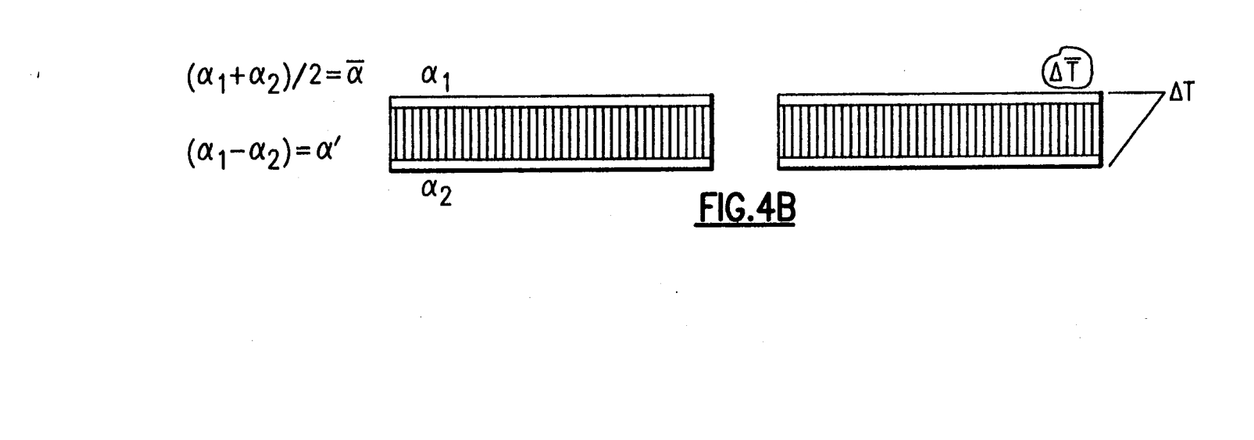
FIG. 4B shows a pair of mirror segments which illustrate the concepts of average CTE, axial CTE (through the mirror segment), bulk average temperature difference, and average axial temperature gradient.

The requirements for the CTE ($\alpha$) and temperature change ($\Delta T$) for this example mirror are summarized in FIG. 4A where the relationships between temperature change and CTE differences to achieve a specific (0.025λrms) $\Delta WF$ is plotted. Included here are axial temperature gradients ($\Delta T'$) and bulk average ($\Delta \overline{T}$) changes acting on segments of different average coefficients of thermal expansion ($\overline{\alpha}$) and different back-to-front CTE differences ($\Delta \alpha'$). The significance of this plot is that the primary operational drivers for achieving radius of curvature thermal stability is that for a typical $\Delta WF$ of 0.025λrms CTE's for the back and front need to be matched to about 4–5 ppb if the average temperature changes by a typical value of 5° F. Conversely, if the axial gradient change is 5°, the average CTE's of the mirrors need to be matched within 4–5 ppb. And as the size of the mirror might increase, these tolerances are reduced by the square of the increase. The basis for the curves shown in FIG. 4A is the following equation:

$$\Delta R = \frac{R^2}{h} [\sqrt{(\Delta \overline{\alpha} \Delta T)^2 + (\Delta \alpha' \Delta T)^2}] \quad (1)$$

which represents a simplified version of the more complete expression shown below:

$$\Delta R = R \overline{\alpha} \Delta(\Delta \overline{T}) + R \Delta \overline{\alpha} \Delta \overline{T} + \{R^2 + h\} \{\overline{\alpha} \Delta (\Delta T') + \Delta \alpha' \Delta \overline{T} + \alpha' \Delta (\Delta \overline{T}) + \Delta \overline{\alpha} \Delta T'\}$$

where alpha bar ($\overline{\alpha}$) = average CTE of a segment
delta alpha bar ($\Delta \overline{\alpha}$) = difference in average CTE's between segments
alpha prime ($\alpha'$) = axial CTE through mirror
delta alpha prime ($\Delta \alpha'$) = difference in axial CTE gradients between mirrors
delta T bar ($\Delta \overline{T}$) = bulk average temperature difference (batd) from manufacture
delta delta T bar ($\Delta(\Delta \overline{T})$) = difference in batd's between segments
delta T prime ($\Delta T'$) = average axial gradient through mirror
delta delta T prime ($\Delta(\Delta T')$) = difference in axial gradients between segments These definitions may be understood in relation to the illustration of FIG. 4B.

Thus, Equation (1) only includes the principal material drivers, i.e., the rest of the factors of the expression shown in FIG. 4B may be neglected, if desired.

FIG. 4A shows these principal drivers as "Pairing Combinations" for a 0.025λ wavefront error. The pairing combinations are:
- matched bulk average CTE's ($\Delta \overline{\alpha} \Delta T'$); and
- matched faceplate CTE's ($\Delta \alpha' \Delta \overline{T}$).

FIG. 4A may be read for either or both of these pairs. For example, for a segment of length 1.2 m, for a $\Delta \overline{T}$ (bulk average temperature difference from manufacture of 5°, a $\Delta \alpha'$ (difference in axial CTE gradients between mirror segments) will be found. A similar relation exists for $\Delta \overline{\alpha}$ and $\Delta T'$.

The coefficients of thermal expansion of individual mirror segments can be sufficiently altered in a deterministic manner, according to the present invention, by the application of metallic or dielectric coatings, whose thicknesses range from less than one to several microns, to relieve the stringent substrate expansivity tolerances identified in FIG. 4A. If, for example, the plate 11 of FIG. 3A has a lower expansivity than that of the top plate 12, then the mirror segment 10 will tend to bow upwards with increasing temperature. According to the present invention, the outer surface of the lower plate 11 is plated with a high expansivity thin film so as to coerce the lower plate 11 to have a higher expansivity which matches that of the upper plate 12. This will cause the lower plate 11 to change with temperature in a manner similar to that of the top plate 12. Coefficient of thermal expansion alteration by such a 'tuning' process has two important effects, namely:

a) reducing the burden in matching coefficients of thermal expansion; and b) enabling matching tolerances on the order of 1 to 2 ppb to be achieved, thereby doubling or tripling the allowable temperature gradients and even achieving some performance margin based on predicted temperature control limits.

Figure 5:
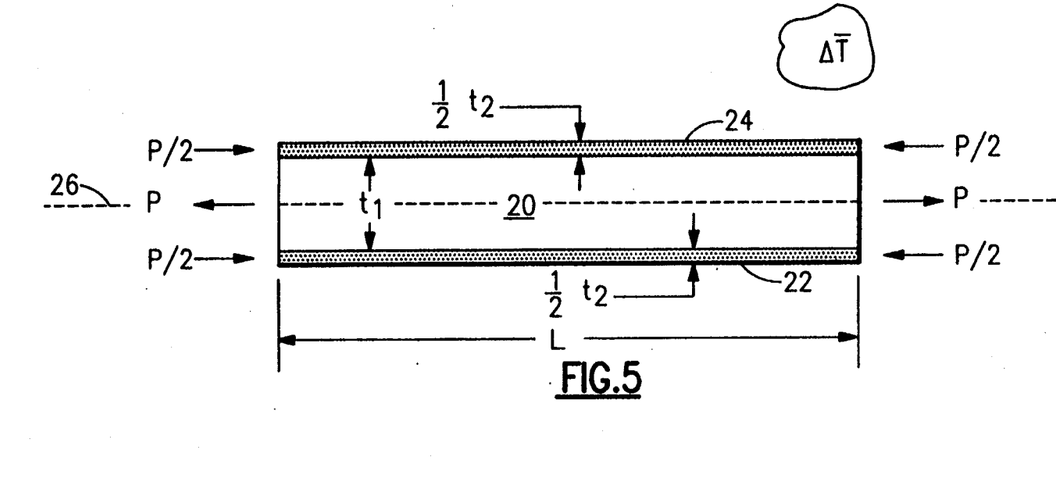
FIG. 5 shows a bar of material which, according to the invention, may have its coefficient of thermal expansion altered by application of thick coatings symmetrically arranged about a neutral axis thereof.

The idea is explained further as illustrated in FIG. 5 where the net effective coefficient of thermal expansion of a bar of material 20 is altered by the application of thick coatings 22, 24, symmetrically arranged about a neutral axis 26 of the parent bar 20. The net effective coefficient of thermal expansion resulting from this process is given by a relatively simple expression, borrowed from elementary laminate analysis theory.

$$\text{Average } \alpha(\bar{\alpha}) = \{\alpha_c E_c t_c + \alpha_g E_g t_g\} \div \{E_c t_c + E_g t_g\} \tag{2}$$

Again, $\alpha$ is the coefficient of thermal expansion. The subscript denotes whether it is of the coating (c) or of the substrate material which may be assumed to be glass (g) for the example. E is the modulus of elasticity (force per unit area) of the specific material, and t is the thickness.

Ironically, we are taking advantage of a phenomenon that at times plagues opto-mechanical systems designers, namely the bi-metallic effect of coatings on substrates which are exposed to large isothermal temperature swings. More about this will be presented below.

Referring to FIG. 5, we can say for the parent bar, denoted by the subscript "1", that its length change $\Delta_1$, due to a temperature change, $\Delta T$, and the interaction it has with the coatings, the force "P" is:

$$\Delta_1 = \frac{PL}{E_1 t_1} + \alpha_1 L \Delta T \tag{3}$$

where $\alpha_1$ = CTE of parent material, e.g., glass,
$\Delta T$ = temperature change,
$t_1$ = parent material thickness,
$E_1$ = modulus of elasticity of the parent material,
P = internal force,
L = length of parent material, and
$\Delta_1$ = change in length of bar $L_1$.

Similarly, for the coatings, we can say:

$$\Delta_2 = \frac{PL}{E_2 t_2} + \alpha_2 L \Delta T \tag{4}$$

where $t_2$ = total coating thickness,
$\alpha_2$ = CTE of coating material,
$E_2$ = modulus of elasticity of the coating material, and
$\Delta_2$ = change in length of coatings.

For displacement continuity between the bar and the coatings, $\Delta_1 = \Delta_2$; therefore:

$$P = \frac{(\alpha_2 - \alpha_1) \Delta T}{\frac{1}{E_1 t_1} + \frac{1}{E_2 t_2}} \tag{5}$$

And, substituting equation (5) in equation (3) we obtain:

$$\Delta_1 = \left\{ \left[ \frac{(\alpha_2 - \alpha_1) \Delta T}{\frac{1}{E_1 t_1} + \frac{1}{E_2 t_2}} \right] \cdot \left[ \frac{L}{t_1 E_1} \right] \right\} + \alpha_1 L \Delta T \tag{6}$$

We can express the effective or average CTE as:

$$\bar{\alpha} = \frac{\Delta_1}{L \Delta T} = \frac{(\alpha_2 - \alpha_1)}{1 + \frac{t_1 E_1}{t_2 E_2}} + \alpha_1. \tag{7}$$

With some manipulation, $$\bar{\alpha} = \frac{\alpha_2 + \alpha_1 \frac{t_1 E_1}{t_2 E_2} t_2 E_2}{t_2 E_2 + t_1 E_1}. \tag{8}$$

And finally, $$\bar{\alpha} = \frac{t_2 E_2 \alpha_2 + t_1 E_1 \alpha_1}{t_2 E_2 + t_1 E_1}. \tag{9}$$

Figure 6:
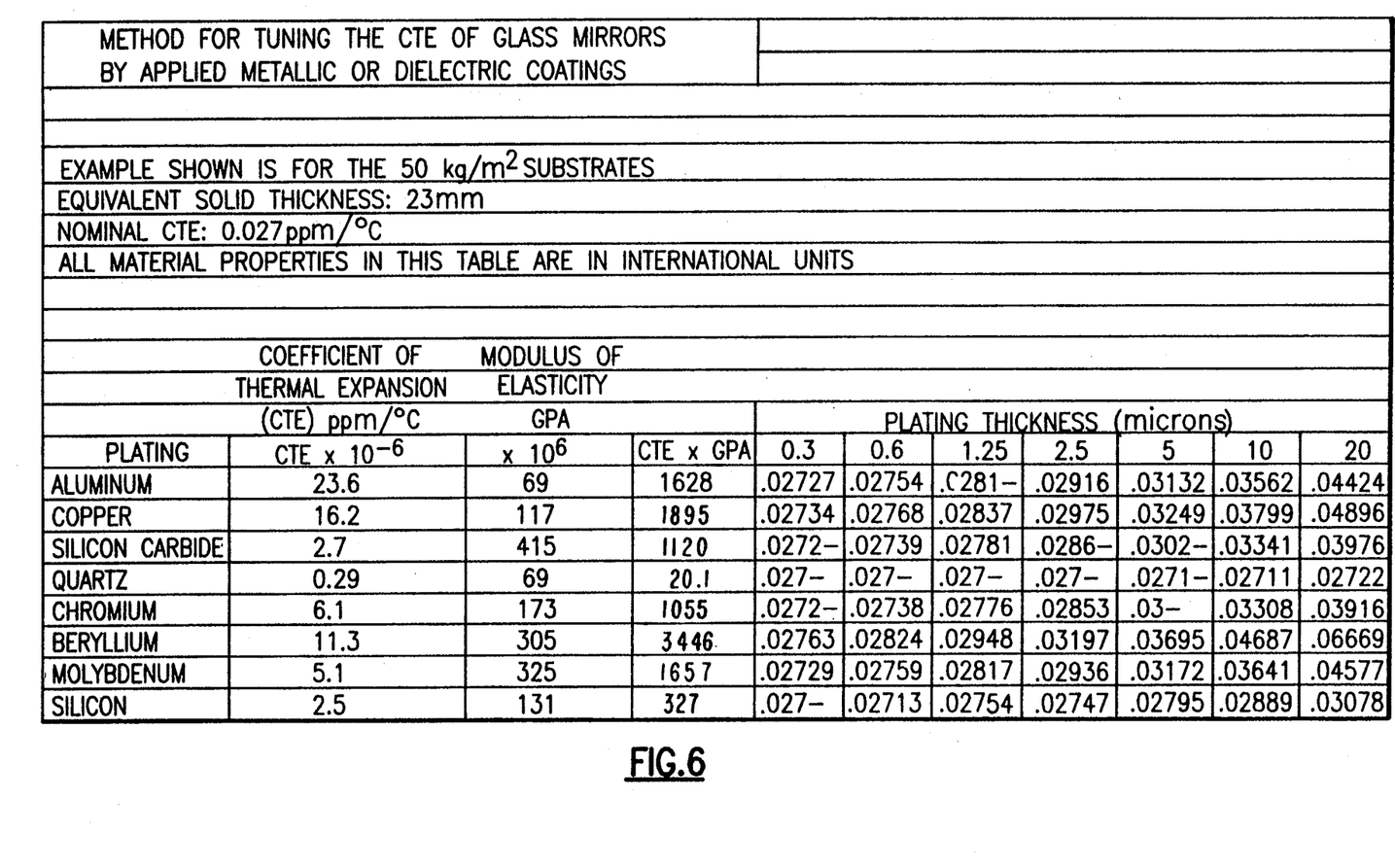
FIG. 6 shows a table which illustrates various plating materials and corresponding performances, according to the present invention.

Equation (9) was solved for a variety of candidate coating (plating) materials of varying thickness applied to a 50 kg/m² ultra low expansion glass mirror whose nominal coefficient of thermal expansion is 0.027 ppm/°C., being typical of low CTE glasses. The sandwich mirror 20, 22, 24 of FIG. 5 can be converted to an equivalent solid by simply dividing it's areal density or weight per unit area, by the factor, 55 (kg/m²) per inch of thickness "Equivalent" in this instance, refers to the effective in-plane tensile area of the substrate. Interestingly, a 100 cm × 100 cm × 2.54 cm piece of ULE glass weighs 55 kg, so that a 50 kg/m² mirror has an effective solid thickness of 50/55, or 2.31 cm, and that is the value that should be used for $t_g$ in equation (2) above. The results are tabulated in FIG. 6 where it is seen that beryllium has the strongest influence in the CTE tuning method of the present invention, as applied to the substrate of the example. If the plating thickness were zero (this case was not shown), of course, the coefficient of thermal expansion of the mirror would remain at 0.027 ppm/° C.

A 5 micron thick beryllium coating on the front 12 and back 11 of a mirror of the type shown in FIG. 1 whose nominal coefficient of thermal expansion is, for example, 0.017 ppm/° C. will produce a change of 0.018 ppm. Copper and aluminum are also effective as coefficient of thermal expansion modifiers. In such cases, thicknesses on the order of 3 to 5 microns would be needed to compensate for the anticipated range of coefficient of thermal expansion variations in mirrors of the type shown in FIG. 1. It is important to note that a coating thickness error of a fifth of a micron will have no practical influence on the coefficient of thermal expansion tuning process, as one would wish. The fifth micron tolerance is conservative compared to what can actually be achieved in practice.

A final selection of the plating or coating material must include considerations of deposition stresses (they need to be avoided) in the thickness ranges of interest, adherence, smoothness and specularity and compatibility with the final optical coating, mechanical properties in the deposition thickness ranges of interest. Multiple coating materials may be needed; for example, it is sometimes necessary to first apply a 20 or 50 Å strike coat of chrome to provide good adherence for the subsequent coating materials. Additionally, the final coating thickness may need to be built up from several thinner applications to avoid some issues associated with thick coatings, for example, that they become 'stressy'.

Typical optical coatings such as aluminum are on the order of 500 to 1000 Å. In this CTE modifying process we are looking towards thicknesses as great as 50,000 Å or 5 microns. As stated above, certain coatings, as they become thicker, they tend to develop significant internal stresses as a consequence of the plating process itself. This is particularly true of nickel, not a candidate for the example shown here, which can produce spalling fractures in glass due to its high tensile deposition stresses, at least when applied by electrolytic deposition. The screening of candidate materials via small-scale experiments may be done on optical flats to observe whether or not deposition stresses are sufficiently high by observing if power is introduced.

Figure 3B:
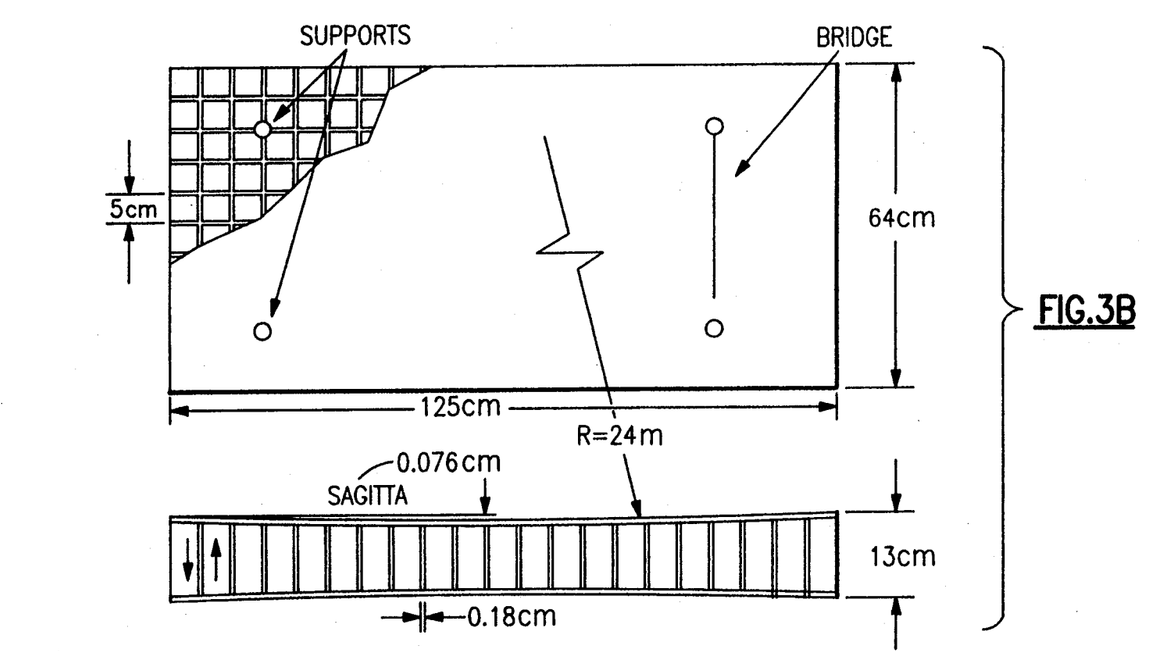
Figure 7:
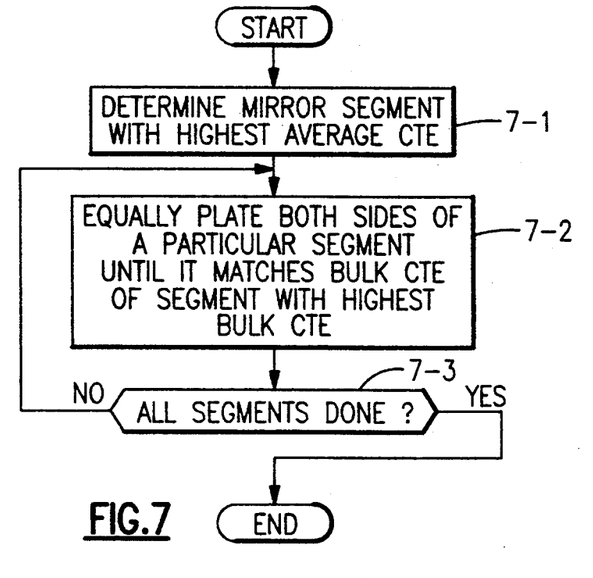
FIG. 7 illustrates a process comprising steps for adjusting CTE differences of individual segments, according to the invention.

As applied to a segmented mirror such as shown in FIG. 1, made up of segments such as shown in FIG. 3B, a fabrication process may be performed as shown in the steps of FIG. 7. The substrate with the highest average coefficient of thermal expansion would be identified as shown in a step 7-1. A step 7-2 is next performed where one or both sides of one of the other segments are plated, e.g., equally plated; they could be plated with equal thicknesses until the segment's bulk CTE is brought up to the same value identified for the segment in step 7-1. After determining in a step 7-3 that all of the segments have been plated have bulk CTEs that equal the highest bulk CTE, then the process is at an end. All segments then have the same bulk CTE. The segments that are put through the coefficient of thermal expansion tuning process of FIG. 7, according to the present invention, may all be matched within 2 or 3 ppm, or whatever the final requirement ultimately may be. The average coefficient of thermal expansion of the segments may then be calculated from component (faceplate) coefficient of thermal expansion measurements made by the substrate manufacturer, e.g., Corning Glass Co., and furnished with the substrate acceptance data package. For all intents and purposes, the net effective coefficient of thermal expansion of such a mirror is equal to the average of the two faceplates 11, 12.

Figure 8:
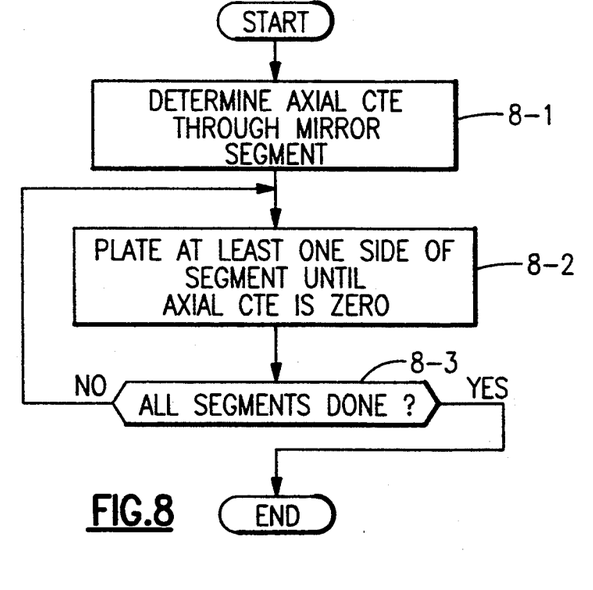
FIG. 8 illustrates a process, according to the present invention comprising steps for adjusting the bulk CTE of a plurality of segments to match a desired bulk CTE.

As previously suggested, and as shown in FIG. 8, it is also possible to compensate for excessive back-to-front coefficient of thermal expansion differences within a specific mirror by plating one side or by using different plating thicknesses on the front and back. For example, a lower coefficient of thermal expansion faceplate would have a thicker coating to raise its coefficient of thermal expansion towards the higher one. The thickness of the front and back coatings of course may still be summed to a total needed for bulk coefficient of thermal expansion matching.

FIG. 8 shows a process, according to the present invention, for matching front-to-back CTEs of a particular segment and then repeating the process for all segments. For example, in a step 8-1, the axial CTE for a particular segment is determined. One side of the segment is then plated, as indicated in a step 8-2 until the axial CTE is zero. In other words, a non-zero axial CTE indicates that the CTE at the opposite surface is not the same. After that the selected side of the segment is plated until the axial CTE is made to be zero, a step 8-3 is performed to determine whether the other segments have all been done or not. If not, steps 8-1 and 8-2 are repeated for each and every mirror segment until all segments are determined to be done in step 8-3. At that point, the process is finished.

With regard to post-coating smoothing, even at several microns, it is believed that for most cases, a specular surface can be achieved. In the event that this proves not to be the case, then some form of post-coating smoothing would need to be employed. If it becomes necessary to improve the quality of the coating in the high spatial frequency and micro-roughness regimes but without altering the basic curvature of the segment, Plasma Assisted Chemical Etching (PACE) provides a possible solution. The most likely coatings are all metals and therefore highly compatible with the PACE process.

The invention, having been shown and described with respect to a best mode embodiment thereof, it should be realized that the foregoing and various other changes, omissions and additions in the form and detail thereof may be made therein without departing from the spirit and scope of the invention. It should be further understood that the terms coating and plating are interchangeable as used herein with out departing from the scope of the invention.

I claim:

1. A method for coating a mirror segment having front and back surfaces, comprising the steps of:
   determining a front to back coefficient of thermal expansion (CTE) difference for the mirror;
   coating a selected surface to reduce the CTE difference; and
   coating the other surface to obtain a selected overall bulk coefficient of thermal expansion for the mirror segment.

2. The method of claim 1, further comprising the step of selecting for assembly a plurality of mirror segments having coefficients of thermal expansion matched by coatings.

3. The method of claim 1 wherein the CTE difference is reduced to zero by the coating step.

4. A method for fabricating segments for a segmented mirror, comprising the steps of:
   determining from among a plurality of mirror segments a mirror segment with a highest average coefficient of thermal expansion; and
   coating each of the remaining segments of the plurality of mirror segments to match the average coefficient of thermal expansion of the segment with the highest average coefficient of thermal expansion.

5. The method of claim 4, wherein said step of coating comprises the step of equally plating both sides of each segment.

6. The method of claim 4, further comprising the steps of:
   determining for each segment an axial coefficient of thermal expansion of the mirror; and
   coating each segment until the axial coefficient of thermal expansion thereof is reduced.

7. The method of claim 6, wherein the coating of each segment is for reducing the axial coefficient of thermal expansion to zero.

8. A mirror comprising:
   a plurality of front and back surfaces, one or more of the front and back surfaces being coated with a substance that has a thickness selected to match a coefficient of thermal expansion for one or more said coated surfaces to a common coefficient of thermal expansion.

9. A segmented mirror, comprising:
   a plurality of mirror segments having one or more coatings on each, wherein the coatings are selected for each segment to reduce an axial coefficient of thermal expansion thereof, and wherein the coatings are selected for each segment to match the bulk coefficient of thermal expansion of each segment with a selected bulk coefficient of thermal expansion.

* * * * *